United States Patent Office 3,399,175
Patented Aug. 27, 1968

3,399,175
PROCESS FOR PREPARING POLYMERS OF ETH-
YLENIC BORON AND ETHYLENIC ALUMINUM
COMPOUNDS
Gaetano F. D'Alelio, South Bend, Ind., assignor, by direct
and mesne assignments, to Dal Mon Research Co.,
Cleveland, Ohio, a corporation of Delaware
No Drawing. Continuation-in-part of application Ser. No.
859,090, Dec. 14, 1968. This application May 11, 1965,
Ser. No. 455,003
11 Claims. (Cl. 260—80)

This invention relates to a process for the polymerization of monomers containing a terminal ethylenic group and a boron or aluminum atom, and also the polymeric products obtained thereby. More specifically, this invention relates to the addition-polymerization of such monomers catalyzed by a heterogeneous catalyst comprising a transition metal compound in an intermediate valency state.

Unsuccessful attempts have been made to prepare polymers of alkenyl boron and alkenyl aluminum compounds. Because of the boron or aluminum content of such polymers, it is believed they would be very useful in high energy fuels for propelling missiles, rockets, etc. In view of the reactivity of the metal contained therein, such monomers necessarily require polymerization conditions which will not remove the metal during the course of the polymerization.

It has now been found that compounds containing boron or aluminum and an alkenyl radical which has a terminal ethylenic group, that is a vinyl group, therein can be polymerized by the addition polymerization of the vinyl group effected by a heterogeneous catalyst comprising a transition metal compound in an intermediate valency state. The monomeric materials used in the practice of this invention are those having the formula $$CH_2=CH-Z-MR_2$$

wherein M represents either boron or aluminum, R is a hydrocarbon radical and can be aliphatic, aromatic, cycloaliphatic, and various combinations of said radicals, and can contain additional ethylenic unsaturation therein. R is monovalent except when it represents parts of a ring structure, in which case R is divalent and is attached to the other R group to form a cyclic ring containing the M atom, or is attached to the Z radical so as to form a cyclic ring containing R, Z, and M. Z represents either a single bond which connects the M directly to the vinyl group, a divalent hydrocarbon group including aliphatic, aliphatic-aromatic, and cycloaliphatic groups, or trivalent hydrocarbon groups also including aliphatic, aliphatic-aromatic, and cycloaliphatic groups, the third valency being attached to another $MR_2$ group, or being attached to the second valency of a divalent R group so as to form a cyclic ring containing Z, R, and M. When Z contains an aromatic nucleus, there is at least one aliphatic carbon atom separating the aromatic nucleus from the vinyl group, and also at least one aliphatic carbon atom separating the aromatic nucleus from the M atom.

It is generally advantageous that neither the Z nor the R group have more than ten carbon atoms. Preferably, Z consists of a single bond or a low number of methylene groups so as to result in polymers having a high ratio of metal. Preferred monomers are those having the formula $$CH_2=CH-(CR'_2)_n-MR''_2$$

wherein R' represents alkyl groups of no more than two carbon atoms and preferably hydrogen, preferably with a total of no more than six carbon atoms in the $(CR'_2)_n$ group, n has a value of zero to three, and R" is an alkyl group of no more than four carbon atoms.

Polymers made according to the practice of this invention can contain as much as approximately 32 percent of aluminum, or as much as approximately 16 percent of boron in the polymer molecules. By selecting monomers having a high proportion of hydrocarbon therein, or by forming copolymers with comonomers which contain neither aluminum nor boron therein, the metal content can be reduced to a very small amount. While it is desirable to have a large proportion of metal for compositions which are to be used as high energy fuels, it has been found that compositions containing as little as 0.1 percent metal can be used to improve the ignition properties of conventional types of fuel, such as motor fuel, jet fuel, kerosene, etc.

Polymer products obtained by the practice of this invention have a plurality of repeating units therein having the formula

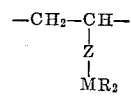

wherein Z, M, and R are as defined above. In cases where R represents part of a cyclic ring, the formulas of the repeating units also can be represented by

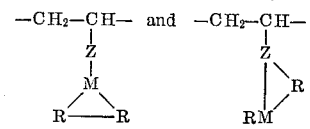

When R comprises an alkenyl group the resultant polymer sometimes contains some crosslinking repeating units having the formula

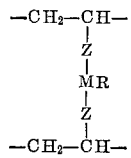

and sometimes incompletely reacted groups having the repeating unit formula

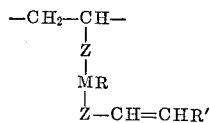

wherein the two Z's are not necessarily alike.

In cases where R is an alkenyl group in which the number of atoms from and including one of the carbon atoms in the vinyl group to and including one of the ethylenic carbon atoms in the alkenyl group is 5 to 7, cyclic structures can result by the inclusion in the same linear polymer chain of the two alkenyl groups of the same monomer molecule. Such cyclic structures have repeating units of the formula

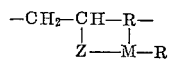

or, where R can be represented as another $$-Z-CH=CH_2$$

group, such cyclic structures have the formula

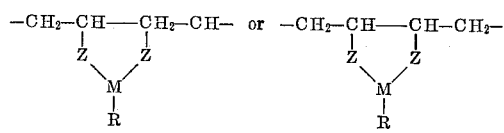

Specific examples of polymeric repeating units having such cyclic structures are the following derived from diallyl methyl boron and butenyl vinyl ethyl aluminum respectively

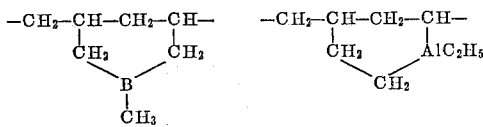

Corresponding repeating units derived from butenyl allyl ethyl aluminum have the formula

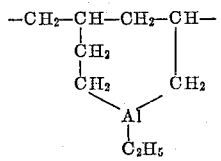

Corresponding repeating units derived from allyl vinyl methyl boron have the structure

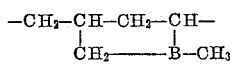

Catalyst systems advantageously used in the process of this invention comprise transition metal compounds in an intermediate valency state. The appropriate intermediate valency state can be derived by:

(a) Oxidation of the transition metal to an intermediary valency state, or by (b) Reduction of a transition metal compound to an intermediate valency state.

By "intermediate valency state" is meant the state higher than the lowest valency state of the metal and lower than its highest valency state.

Oxidizing agents found particularly effective are halogen-containing metal compounds selected from the metal halides of groups III, IV, V, VI, VII and VIII alkyl halides, halogens, or oxygen or oxygen-containing gases, etc. These catalysts also are prepared easily by reducing a compound of the transition metals, for example, by reduction of the halides or esters. The oxidation or reduction can be conducted by any convenient method, for example, by heating or by intimate contact, such as by ball milling.

In general, the transition metal compounds are reduced readily by metals of the groups I, II–VIII, inclusive, but generally metals of groups II–VIII are preferred for their greater activity, whereas the metals of groups III–VIII are preferred particularly because of the increased catalytic activity resulting from their use. The transition metal compounds also man be reduced by organo-metal compounds, such as Grignard reagents, metal alkyls, or organo-metallic compounds, such as phenyl magnesium bromide, aluminum trialkyls, lithium aluminum tetra-alkyls, cadmium dialkyls, tin tetra-alkyls, etc., and also by metal hydrides, such as aluminum hydride, lithium aluminum hydride, etc. The alkenyl aluminum monomers themselves can be used for such purpose but are more expensive than the corresponding alkyl compounds.

Specific examples of such catalyst systems are those prepared from titanium tetrachloride and aluminum triethyl, titanium tetrachloride and lithium aluminum tetrabutyl, titanium tetrachloride and phenyl magnesium bromide, titanium tetrachloride and aluminum tributyl, titanium tetrachloride and aluminum, titanium tetrachloride and chromium, titanium tetrachloride and iron, zirconium tetrachloride and aluminum tributyl, zirconium tetrachloride and aluminum, titanium tetrachloride and mercury, titanium tetrachloride and nickel, titanium tetrachloride and cobalt, zirconium tetrachloride and vanadium, etc.

A particularly suitable catalyst for the process of this invention is titanium tetrachloride and an aluminum trialkyl. While other ratios of catalyst compounds can be used to give varying yields of polymer products, the preferred range of catalyst components is 0.8 to 1.1 molar portions of the aluminum compound per molar portion of titanium tetrachloride. While even lower proportions of catalysts also will give polymer products, a proportion of at least 0.04 mole of catalyst (moles of aluminum component plus moles of titanium component) per mole of polymerizable monomer is found advantageous to give good yields of polymer product.

In general, the proportion of catalyst advantageouly is between 0.001 and 0.1 part of catalyst per part of monomer used. While the use of greater quantities of catalyst gives satisfactory results within the scope of this invention, no particular advantage is obtained by the use of excessive amounts of catalyst. In systems where a metal compound is used to produce the catalyst by reduction, an efficient proportion is found to be approximately 0.8 to 1.1 molar portions of reducing metal or metal compound per molar portion of metal being reduced.

In view of the highly reactive nature of the polymerizable monomers and of the catalysts, inert atmospheres, such as nitrogen, argon, etc., are used. The polymerizations advantageously are conducted in the hydrocarbon medium in which the polymer product is at least partially soluble, and which does not have an inhibiting influence on the system. Suitable solvents are benzene, xylene, toluene, tetrahydronaphthalene, cyclopentane, alkylated cyclopentanes, cyclohexane, alkylated cyclohexanes, decolene, partially or completely hydrogenated diphenyl, heptane, hexane, pentane, etc., alone or in admixture with each other. Some of these solvents will be more suitable than others, depending on the various solubility characteristics of the various monomer and polymer products. In general, the conditions suitable for the polymerizations of this invention can be varied to a considerable extent and depend somewhat on the catalytic activity of the specific catalyst system, the monomer, the solvent medium, the concentration of monomer or monomers in the solvent, the heat transfer properties of the solution effecting dissipation of the reaction exotherm, in the presence or absence of impurities in the monomers. The pressure can vary from as low as the freezing point of the solvent, up to and including the boiling point of the solvent, either at or above atmospheric pressure. The temperature can vary depending on the reactivity of the materials and also on the stability of the monomer against decomposition. Temperatures in the range of −10° C. to slightly more than room temperature, e.g., about 50° C., generally are convenient and suitable for polymerization. However, temperatures as low as −70° C. and as high as 150° C. or even higer depending on the stability of the monomer can be used.

Various methods of practicing the invention are illustrated by the following examples. These examples are intended merely to illustrate the invention and not in any sense to limit the manner in which the invention can be practiced. The parts and percentages recited herein and all through the specification, unless specifically provided otherwise, refer to parts by weight and percentages by weight. Unless indicated otherwise, the terms "polymers" and "polymeric" are intended to include "copolymers" and "copolymeric."

EXAMPLE I

An heterogeneous catalyst is prepared by adding one ml. of titanium tetrachloride dissolved in 50 ml. of cyclohexane under an atmosphere of nitrogen to a solution of 5 ml. of triethyl aluminum and 15 ml. of heptane. The mixture is heated for one hour at 40°–50° C. and then allowed to stand overnight at room temperature. The catalyst system is then cooled to a temperature below −20° C. and 50 grams of vinyl dimethyl boron, dissolved in 50 ml. of cyclohexane and kept under an atmosphere of nitrogen, is added. The reaction temperature is allowed to come to room temperature and to stand at room temperature for 24 hours. Then 200 ml. of cyclohexane is added, the temperature raised to reflux, the hot solution filtered to remove the catalyst residue, and the filtrate placed under reduced pressure to remove the solvent from the solid polymer product.

Analysis of this product shows a metal content corresponding to the theoretical value for polymeric vinyl dimethyl boron. Upon ignition of a sample of the polymer it shows excellent burning properties.

EXAMPLE II

The procedure of Example I is repeated eight times using in place of the vinyl dimethyl boron in each case an equivalent weight of a different one of the following: allyl dimethyl boron, vinyl diethyl aluminum, 4-(diethyl aluminum)-butene-1, p-(3-diethyl aluminum-propyl, -allyl benzene, 3-phenyl-4-(dimethyl aluminum)-butene-1, allyl dimethyl aluminum, p-(3-dimethyl aluminum-propyl)-allyl benzene, and 1-(beta-dimethyl boronethyl)-4-vinyl cyclohexane. In each case a polymer product is obtained and upon ultimate analysis the values for percentages of metal, carbon, and hydrogen are found to agree closely with the theoretical value for the corresponding addition polymers. Also, in each case, a sample of the polymer product is oxidized or hydroxylated to replace the metal atoms with hydroxy groups according to the following procedure. One-half mole of the product (calculated on the monomeric unit) is treated with 8 parts of sodium hydroxide in 100 parts of ethyl alcohol, and then 60 parts of 30 percent hydrogen peroxide is added to the mixture at such a rate as to maintain gentle reflux. After the addition is completed the oxidized polymer is taken up in ether, washed and dried. Determination of the hydroxy content shows a content thereof equivalent to the metal proportion in the original ploymer. The so-treated product in each case is similar in properties to the corresponding addition polymer with no evidence of linear chain degradation.

EXAMPLE III

A catalyst is prepared according to the procedure of Example I using an equivalent amount of tri-isobutyl aluminum in place of the triethyl aluminum. 40 parts of diallyl monomethyl boron is added in accordance with the procedure of Example I and polymerization effected. A small part of the polymer product is precipitated during the polymerization, apparently because of crosslinking. This amounted to less than 10 percent of the total polymer product. After polymerization is completed, all of the polymer is recovered as in Example I and the crosslinked precipitated polymer is treated with hot cyclohexane to extract soluble polymer therefrom. When the crosslinked polymer is treated as in Example I to displace the metal, a soluble polymer is obtained. The soluble polymer obtained directly from the polymerization and from the extraction of the crosslinked polymer shows substantially no unsaturation upon testing with infrared light. Since the solubility indicates little or no crosslinking, the absence of unsaturation indicates that linear polymers having cyclic rings therein have been formed.

When hydrolyzed as in Example I, this polymer gives a weight of hydrolyzed polymer corresponding closely with the theoretical weight of the corresponding hydroxylated polymer based on the assumption that no allyl groups are lost during the hydrolysis. (If any allyl groups had existed as unsaturated side chains attached to the boron, they would be lost or removed upon hydrolysis.) This indicates that substantially all of the allyl groups are in the polymer chains and since the polymer was soluble, these apparently are in linear chains having cyclic rings as described above since if they were in crosslinkages to any substantial degree the polymer would have been insoluble.

EXAMPLE IV

The procedure of Example III is repeated five times using in each case an equivalent amount of a different polyalkenyl metal compound, namely: diallyl-ethyl aluminum, butenyl-vinyl-ethyl aluminum, butenyl-allyl-ethyl boron, butenyl-allyl-methyl aluminum, allyl-vinyl-methyl boron, respectively, in place of the diallyl methyl boron. In each case similar results are obtained as in Example III. In this and the preceding examples, an equivalent amount of $TiCl_3$ and $ZrCl_3$ respectively are substituted for the $TiCl_4$. In each case similar results are obtained.

EXAMPLE V

A catalyst is prepared by ball-milling together in a nitrogen atmosphere in a stainless steel ball mill for ten days, a mixture of 100 parts of toluene, 15 parts of aluminum powder, and 6 parts of titanium tetrachloride. The ball-milling and transfer of the resultant catalyst mixture to a vacuum vessel is conducted in a nitrogen atmosphere. A mixture of 30 parts of toluene and 40 parts of allyl-dimethyl-boron is added to the reaction vessel, and temperature maintained at 50° C. for approximately six hours. The polymer product is recovered and treated as in Example I. The ultimate analyses and displacement reaction show that the polymer product is an addition polymer similar to those obtained in Examples I and II.

EXAMPLE VI

A catalyst prepared by ball-milling as in Example I a mixture of 15 parts of aluminum powder, 7 parts of zirconium tetrachloride, and 100 parts of toluene for approximately ten days is used to polymerize, under an argon atmosphere, a mixture of 10 parts of allyl-dimethyl-boron and 10 parts of allyl-diethyl-aluminum. The resultant copolymer, after recovery and processing as in Example I, shows both boron and aluminum in the polymer molecules.

EXAMPLE VII

A catalyst is prepared by grinding in a ball mill, under a nitrogen atmosphere, for approximately 30 hours, a mixture of 10 parts of granulated titanium sponge, 1 part of aluminum trichloride, and 40 parts of toluene. The product is washed with an additional 40 parts of toluene and transferred, under nitrogen atmosphere, to the reaction vessel. A mixture of 10 parts of styrene, 25 parts of vinyl-dimethyl-boron, in 50 parts of toluene is added to the reaction vessel and polymerized at room temperature for 24 hours. Upon processing the polymer product as in the preceding example, a copolymer of styrene and vinyl-dimethyl-boron is obtained. When this is treated so as to displace the boron atoms with hydroxyl groups, the resultant product resembles styrene-vinyl alcohol copolymers (hydrolyzed styrene-vinyl acetate copolymers) having corresponding portions of styrene and ethylene therein.

EXAMPLE VIII

The procedure of the preceding example is repeated using vinyl-diethyl-aluminum in place of the vinyl-dimethyl-boron, and similar results are obtained.

EXAMPLE IX

The procedure of Example I is repeated, except that the polymerization reaction is conducted in a pressure vessel under 500 pounds per square inch of ethylene. The resultant copolymer, after processing according to Example I, is shown to contain both ethylene and the vinyl boron monomer in the polymer structure. After displacement of the boron by hydroxyl groups, the resulting polymer resembles ethylene-vinyl alcohol copolymers.

EXAMPLE X

The preceding example is repeated using vinyl-diethyl-aluminum instead of the boron monomer, and similar results are obtained.

As indicated above in some of the operating examples, mixtures of two, or even more, of the metal-containing monomers can be used to give copolymers of such monomers, or other monomers, such as ethylene, propylene, styrene, etc., also can be present with the metal-containing monomers. In such latter cases, the ultimate purpose or use of the resultant polymer is one in which a lower content of metal is desired.

When metal-containing monomers having two alkenyl groups in the same monomer molecule are used, as in Examples III and IV, the amount of crosslinked polymer obtained vs. the amount of cyclic linear polymer obtained, depends on the number of atoms in the resultant cyclic ring and the ease with which ethylenic groups can come together to form such a ring. In some cases a considerable amount of unsaturation can be present in the resultant polymer when the second alkenyl group is in such a position or of such a nature that it does not crosslink or form cyclic rings very easily.

While a variety of metal-containing monomers have been illustrated in the examples above, many other metal-containing monomers can be used in the practice of this invention. These can be illustrated by listing the various Z and R groups that can be substituted in the above monomer formula.

Typical Z groups include:

—CH₂—; —CH—; —C(CH₃)₂—; —CH₂CH₂—; —CH(CH₃)CH₂—
         |
         CH₃

—CH—CH—; —CH₂CH(CH₃)—; —(CH₂)₃—; —(CH₂)₄—
  |    |
  CH₃  CH₃

—(CH₂)₅—; —CH₂—CH—; —CH₂—C(C₂H₅)₂—
              |
              C₃H₇

—CH₂CH₂CH—; —CH₂CH=CHCH₂—; —CH₂CH=CH—
        |
        C₃H₇

—(CH₂)₁₂—; —CH(CH₃)(CH₂)₁₀CH(CH₃)—; —CH₂CH(C₆H₅)—
—CH₂CH(C₆H₅)CH₂—; —CH(C₆H₅)CH₂—
—CH₂CH(C₆H₄CH₃)CH₂CH₂—; —CH(C₁₀H₇)CH₂—
—CH₂C₆H₄CH₂—; —CH₂C₁₀H₆CH₂—; —CH₂C₆H₃—CH₂—
                                        |
                                        CH₂CH=CH₂

—CH₂CH₂C₆H₄CH₂CH₂—; —CH₂CH₂C₆H₃—CH₂—
                                |
                                CH₃

—CH₂CH₂C₆H₃—CH₂CH₂—; —CH₂C₆H₃—CH₂—
           |                  |
           CH₂CH₂CH=CH₂       CH₂CH=CHCH₃

—C₆H₁₀—; —C₅H₈—; —CH₂C₆H₁₀—; —CH₂C₆H₁₀CH₂—
—C₅H₈CH₂CH₂—; —CH—; —CHCH₂—; —CH₂CHCH₂—
                |      |          |
                C₆H₁₁  C₆H₁₁      C₃H₉

—CH₃—C₆H₉—CH₂CH₂CH₂—
         |
         CH₂CH=CH₂

Typicals groups illustrating R include, but are not restricted to the following: the monovalent radicals resulting by the attachment of a hydrogen atom to the second valency of the groups listed above for Z, and also various monovalent aryl groups, such as: —C₆H₅; —C₆H₄CH₃; —C₁₀H₇; —C₆H₄CH₂CH=CH₂; —C₁₀H₆CH₂;

—C₆H₄C₂H₅

—C₆H₄C₆H₅; —CH₂C₆H₅; —C₆H₄CH₂CH=CHCH₃;

—CH₂CH₂C₆H₅

—C₃H₇C₆H₅; —CH₂C₆H₄C₆H₅; —CH₂C₁₀H₇; etc.

Typical monomers that can be used include, but are not restricted to, the following specific monomers: vinyl dimethyl boron, vinyl dimethyl aluminum, vinyl diethyl boron, vinyl diethyl aluminum, vinyl dipropyl boron, vinyl dipropyl aluminum, vinyl ethyl propyl boron, vinyl ethyl propyl aluminum, vinyl dibutyl boron, vinyl dibutyl aluminum, vinyl diphenyl boron, vinyl dibenzyl aluminum, vinyl ditolyl boron, vinyl dinaphthyl aluminum, allyl dimethyl boron, allyl dimethyl aluminum, allyl diethyl boron, allyl diethyl aluminum, allyl dipropyl aluminum, allyl dibutyl boron, allyl diamyl aluminum, allyl dicyclohexyl boron, allyl dicyclopentyl aluminum, allyl methyl phenyl boron, allyl diphenyl aluminum, allyl ethyl tolyl aluminum, 4-(dimethyl boron)-butene-1,5-(diethyl aluminum)-pentene-1, diallyl ethyl boron, diallyl propyl aluminum, allyl crotyl ethyl aluminum, diethyl-(para-allyl-benzyl)-aluminum, dimethyl-(para-allyl-phenethyl)-boron, dimethyl-(diallyl-propyl)-boron, and cyclic monomers having the formulas:

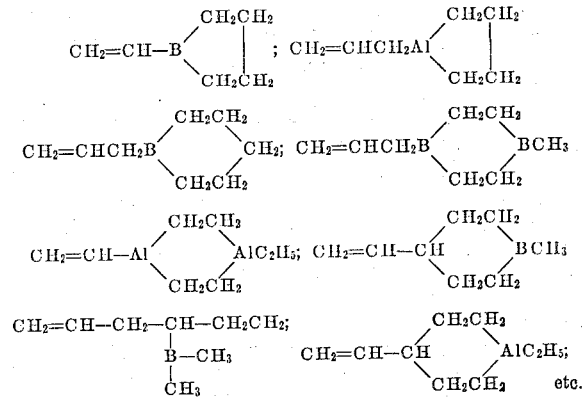

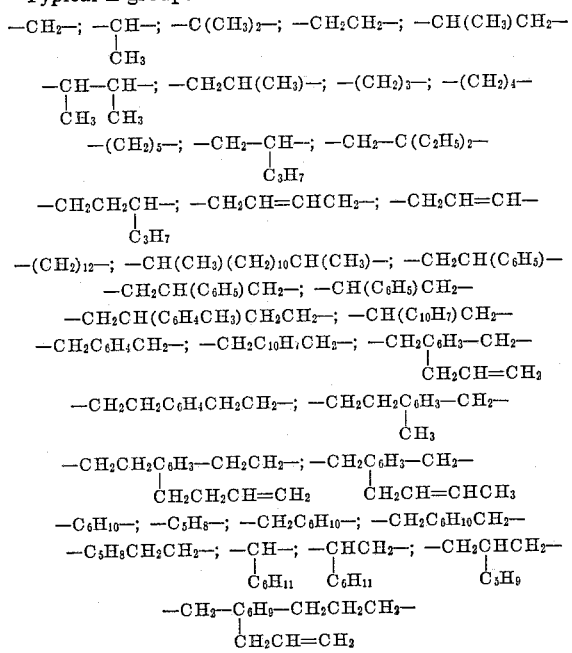

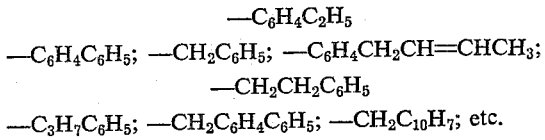

Some of these monomers are known in the prior art. However, such methods used in the prior art for preparing these known monomers can be modified within the skill of any chemist to prepare the various other monomers.

Methods used in the preparation of the various monomers used in the practice of this invention include Grignard reactions and reactions with ethylenically unsaturated tin compounds, such as monovinyl and divinyl tin. These preparations are conducted according to well-known, standard reactions using boron monohalide, or aluminum monohalide, di-substituted with the desired hydrocarbon substituents with the appropriate Grignard reagents containing the desired unsaturated radical. For example, dialkyl boron halides and dialkyl aluminum halides can be used with vinyl magnesium chloride, allyl magnesium bromide, etc. Furthermore these same halides can be used, in accordance with well-known reactions, with divinyl tin, tetravinyl lead, and other tin and lead compounds containing appropriate unsaturated groups. Such reactions are illustrated as follows:

$$CH_2=CHCl + Mg \rightarrow CH_2CHMgCl$$

$$CH_2=CHMgCl + R_2BCl \xrightarrow{\text{Tetrahydrofurane}} CH_2=CHBR_2 + MgCl_2$$

$$CH_2=CHMgCl + R_2AlCl \rightarrow CH_2=CHAlR_2 + MgCl_2$$

Such reactions can be represented by the following general reactions:

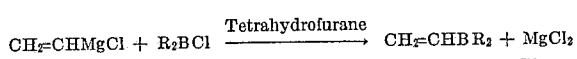

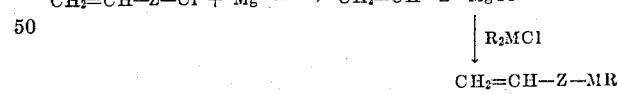

wherein R, M, and Z are as defined above.

Preparation from tin and lead compounds having the desired unsaturated groups also are typified by the following according to well-known reactions:

$$(CH_2=CH)_2Sn + 2R_2BCl \rightarrow 2CH_2=CHBR_2 + SnCl_2$$

$$(CH_2=CHCH_2)_4Pb + 2R_2AlCl \rightarrow$$
$$2CH_2=CHCH_2AlR_2 + SnCl_2$$

$$(CH_2=CHCH_2)_4Pb + 4R_2BCl \rightarrow$$
$$4CH_2=CHCH_2BR_2 + PbCl_4$$

$$(CH_2=CH)_4Pb + 4R_2AlCl \rightarrow 4CH_2=CHAlR_2 + PbCl_4$$

Such monomeric compounds also can be prepared by the reaction of boron monohydrides and aluminum monohydrides, in which the two remaining valencies of boron or aluminum are attached to the desired R groups, by reaction with a considerable excess of acetylenic or diolefinic hydrocarbons in such a manner, for example, by controlling the temperature and time of reaction, that the metal hydrides react only to the extent that there is hydrogen attached to the metal atom in the compound and that the acetylenic or diolefinic material reacts only to the extent of half of the unsaturation therein, e.g.

$$CH_2=CH-CH=CH_2 + R'_2BH \rightarrow CH_2=CHCH_2CH_2BR'_2$$
$$HC\equiv CH + R'_2BH \rightarrow CH_2=CH-BR'_2$$
$$CH_2=CH=CH_2 + R'_2BH \rightarrow CH_2=CHCH_2BR'_2$$

etc. Corresponding reactions can be performed with $R'_2AlH$ to give the corresponding intermediates. This reaction can be catalyzed by ethers.

It is preferred for two reasons that the R groups of the metal hydrides be small aliphatic groups. First, the use of smaller groups results in a higher proportion of metal in the resulting compounds. Secondly, the larger bulky groups retard somewhat the addition of the metal compounds to the unsaturated compounds, thereby necessitating more drastic reaction conditions and longer reaction periods. Therefore, methyl, ethyl, and propyl groups are preferred in place of the bulkier groups, such as phenyl, cyclohexyl, and aliphatic groups having groups attached to that carbon atom which will become attached to the metal atom, such as alpha, beta-dimethyl-propyl, etc.

In working Examples I and II described above, the repeating units present in the respective polymeric products have the following structures:

Example I

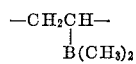

Example II

From vinyl diethyl aluminum:

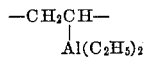

From 4-(diethyl aluminum)-butene-1:

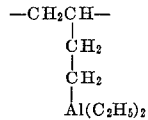

From p-(3-diethyl aluminum-propyl)-allyl benzene:

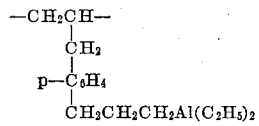

From allyl dimethyl boron:

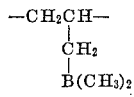

From 3-phenyl-4-(dimethyl aluminum)-butene-1:

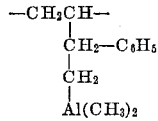

From allyl dimethyl aluminum:

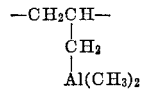

From p-(3-dimethyl aluminum-propyl)-allyl benzene:

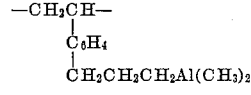

From 1-(beta - dimethyl boron - ethyl) - 4 - vinyl cyclohexane:

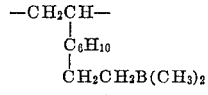

The polymers produced according to the practice of this invention can be made to vary in molecular weight by varying the conditions of polymerization, that is concentrations of monomer and catalyst, temperature, type of catalysts, etc. However, polymers in the range of 6,000–10,000, and even up to 100,000 or more, are easily produced. Also, by varying the polymerization conditions, very low molecular weight polymers can be obtained, even as low as dimers, trimers, or tetramers, etc. Some of these low molecular weight polymers are liquids or oligomers, and can be used as plasticizers or softening agents for the higher molecular weight polymers.

The polymer products of this invention have surprising stability against ignition or explosion at low temperatures which makes it possible to mix with these polymers a considerable amount, in some cases up to 75 or 80 percent, of solid or liquid oxidizing agents, such as potassium nitrate, potassium perchlorate, sodium perchlorate, ammonium perchlorate, etc. These mixtures are stable at normal temperatures and can be processed and stored safely for subsequent use as rocket and missile fuels. The polymers of this invention, particularly those having a high proportion of metal to hydrocarbon are especially useful as rocket and missile fuels. The polymers of the working examples, described above, when tested as rocket fuels show excellent burning and thrust properties.

In addition to forming the various copolymers indicated above, the polymer products of this invention also can be mixed with other polymers or resins for various purposes, particularly where it is desired to improve the burning properties of the other resins. Generally, as little as 5 percent, or even as low as 1 percent, in some cases effect improvement in such properties.

The polymers having a high proportion of metal therein can be mixed with various types of hydrocarbon polymers, together with oxidizing agents, such as indicated above, to form rocket and missile fuels. Where the dilution of the metal containing polymer is not critical, such mixtures can contain as much as a major proportion of such other resinous materials. The polymers of this invention also can be mixed with various modifying agents, such as plasticizers, inhibitors, etc., to modify the properties of the polymer mixture according to what properties are desired for processing or ultimate use of the polymers.

The use of the polymers of this invention as propellants for missiles and rockets is performed according to the general procedures in which solid propellants are used for these purposes. The oxidizing agents can be incorporated in the solid propellant mixture as indicated above, or fluid oxidizing agents can be supplied externally, such as is generally the case with liquid oxygen, highly concentrated hydrogen peroxide, perchloryl fluoride, nitric acid, and other materials commonly used for such purposes.

In the preparation of solid propellant fuels, it is very often desired to have the resultant product thermoset so that it will not melt or run upon exposure to high temperatures. In cases where the presence of the catalyst residues are not objectionable, the polymers can be made crosslinked in situ by using a polymerizable mass containing various crosslinking comonomers, such as divinyl aryl hydrocarbons, namely divinyl benzene, etc., and other divinyl hydrocarbons, such as diallyl, divinyl cyclohexane, etc.

In cases where it is undesirable to have the catalyst residues embodied in the final product, or the process of removing the catalyst before gellation is difficult or undesirable, the polymers can be made linear or thermoplastic and by a post-treatment converted to a thermoset resin after the catalyst has been removed and any desired additional components or modifying agents have been added. For example, crosslinking modifiers, such as the divinyl compounds indicated above, can be mixed with the metal-containing polymers and other components, formed into the desired shape, and then radiated with high energy ionizing radiation to effect crosslinking by grafting of the divinyl comonomers to the metal-containing polymer molecules. In many cases the catalyst can be deactivated by the addition of a stoichiometric amount of methanol and the catalyst residues removed or left in the product if desired.

Particularly effective and preferred catalyst systems in the practice of this invention are those of Examples I–IV in which the polymerization catalysts are prepared by the reaction of an aluminum trialkyl with titanium tetrachloride, titanium trichloride or zirconium trichloride.

The molar ratio of the aluminum compound is 0.8 to 1 mole of the aluminum compound per mole of the titanium tetrachloride, titanium trichloride or zirconium trichloride.

In the polymerizations using these catalyst systems, preferably at least 0.04 mole of catalyst is used per mole of polymerizable monomer, and preferably the inert medium is a liquid hydrocarbon. Moreover, the polymerization is preferably conducted at a temperature in the range of −10° C. to 50° C.

In the preparation of polymeric polyhydroxy compositions by hydroxylation of the metal-containing polymeric compositions described in the application, the metal atoms are replaced by hydroxyl groups, with a hydroxyl group replacing each valency bond of the metal atom connected to the polymeric structure. For example, where a repeating unit in the polymeric structure has the formula

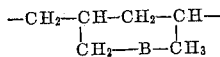

the resultant repeating unit has the structure

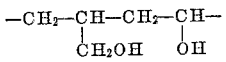

Likewise where the repeating unit in the polymeric structure has the formula

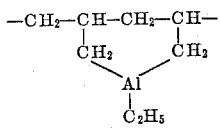

the resulting hydroxylated polymer has a repeating unit structure of the formula

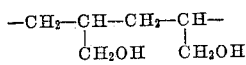

The hydroxylation of the polymers containing the metal atoms is preferably effected under alkaline conditions at a temperature of 20–110° C. with an aqueous solution of hydrogen peroxide of a concentration of 5–50 percent, preferably approximately 30 percent, and in an amount approximately equivalent to the amount of metal to be displaced from the polymer. In addition to the sodium hydroxide solutions illustrated above, various other well known alkaline media can be used to promote the hydrogen peroxide hydroxylation. Such well known alkaline agents include the various alkali and alkaline earth metal hydroxides, carbonates, acetates and bicarbonates, ammonium hydroxide, etc. For example, such alkaline agents can be used as potassium hydroxide, lithium hydroxide, cesium hydroxide, calcium hydroxide, barium hydroxide, magnesium carbonate, magnesium bicarbonate, barium carbonate, barium bicarbonate, sodium acetate, potassium acetate, magnesium acetate, barium acetate, calcium acetate, etc.

The amount of alkaline material is not critical. Advantageously enough is used to maintain an alkaline pH condition.

When the hydroxylations of Examples II–IV are repeated using in place of the sodium hydroxide used therein, an equivalent amount of each of the various alkaline reagents listed above, similar hydroxylations are obtained. Moreover, while alcohol is the preferred solvent for the alkaline material, water or other appropriate solvent for the alkaline material can be used to effect similar reaction.

This application is a continuation-in-part of copending application Ser. No. 859,090, filed Dec. 14, 1959.

While certain features of this invention have been described in detail with respect to various embodiments thereof, it will, of course, be apparent that other modifications can be made within the spirit and scope of this invention and it is not intended to limit the invention to the exact details shown above except insofar as they are defined in the following claims.

The invention claimed is:

1. A process for the preparation of a metal-containing polymer comprising the step of polymerizing an alkenyl metal-containing compound having a formula selected from the class consisting of

and

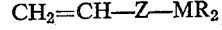

wherein M represents a metal selected from the class consisting of boron and aluminum, R is a hydrocarbon radical selected from the class consisting of aliphatic, aromatic, cycloaliphatic, aliphatic-aromatic, aliphatic-cycloaliphatic, and aromatic-cycloaliphatic monovalent radicals, and divalent aliphatic radicals, said R group representing said divalent aliphatic radicals only when it is part of a cyclic ring structure and the second valency thereof is attached to another group in the compound so as to form a cyclic ring therewith, said other group being selected from the class consisting of the other R group and the Z group of said formula; Z is a structure selected from the class consisting of (1) a divalent radical selected from the class consisting of aliphatic, aliphatic-aromatic, and cycloaliphatic divalent hydrocarbon groups and derivatives thereof in which the sole derivative group is —MR$_2$ and (2) trivalent hydrocarbon radicals selected from the class consisting of aliphatic, aliphatic-aromatic, and cycloaliphatic trivalent hydrocarbon groups and the —MR$_2$ derivatives thereof, said third valency of said trivalent groups being attached to the second valency of a divalent R group thereby forming a cyclic ring therewith, said aliphatic-aromatic radicals of (1) and (2) having at least one aliphatic carbon atom between the aromatic nuclei thereof and the vinyl group of said formula and also between said aromatic nuclei and said —MR$_2$ group; said polymerization being conducted in an inert medium while said polymerizable mass is in intimate contact with at least 0.001 part, per part of polymerizable monomer used, of a catalyst comprising the reaction product of an aluminum trialkyl with a metal halide selected from the class consisting of titanium tetrachloride, titanium trichloride and zirconium trichloride.

2. A process of claim 1 in which said polymerization catalyst is prepared by the reaction of titanium tetrachloride with an aluminum trialkyl.

3. A process of claim 2 in which 0.8 to 1.1 molar portions of the aluminum compound are used per molar portion of titanium tetrachloride in the preparation of said catalyst.

4. A process of claim 3 in which at least 0.04 mole of catalyst is used per mole of polymerizable monomer.

5. A process of claim 4 in which said inert medium is liquid hydrocarbon.

6. A process of claim 5 in which said polymerization is conducted at a temperature in the range of −10° C. to 50° C.

7. A process of claim 1 in which said polymerization catalyst is prepared by the reaction of titanium trichloride with an aluminum trialkyl.

8. A process of claim 7 in which 0.8 to 1.1 molar portions of the aluminum compound are used per molar portion of titanium tetrachloride in the preparation of said catalyst.

9. A process of claim 8 in which at least 0.04 mole of catalyst is used per mole of polymerizable monomer.

10. A process of claim 9 in which said inert medium is a liquid hydrocarbon.

11. A process of claim 10 in which said polymerization is conducted at a temperature in the range of −10° C. to 50° C.

References Cited

UNITED STATES PATENTS 2,921,954 1/1960 Ramsden _____ 260—80
3,010,985 11/1961 Ramsden _____ 260—80

JOSEPH L. SCHOFER, *Primary Examiner.*

C. A. HENDERSON, Jr., *Assistant Examiner.*